(12) United States Patent
Faber et al.

(10) Patent No.: US 6,920,221 B1
(45) Date of Patent: Jul. 19, 2005

(54) METHOD AND APPARATUS FOR PROTECTED EXCHANGE OF STATUS AND SECRET VALUES BETWEEN A VIDEO SOURCE APPLICATION AND A VIDEO HARDWARE INTERFACE

(75) Inventors: Robert W. Faber, Hillsboro, OR (US); David A. Lee, Beaverton, OR (US); Brendan Traw, Portland, OR (US); Gary L. Graunke, Hillsboro, OR (US); Richard P. Mangold, Forest Grove, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/540,190

(22) Filed: Mar. 31, 2000

Related U.S. Application Data

(63) Continuation-in-part of application No. 09/385,590, filed on Aug. 29, 1999, and a continuation-in-part of application No. 09/385,592, filed on Aug. 29, 1999.

(51) Int. Cl.$^7$ .............................. H04N 7/167; H04L 9/32
(52) U.S. Cl. ....................... 380/200; 380/201; 380/259; 380/44; 713/193
(58) Field of Search ................................ 380/200–203, 380/210–211, 229, 259–261, 268, 44, 46–47; 713/168–171, 193; 725/25, 31, 105, 131, 143, 145–146; 705/56

(56) References Cited

U.S. PATENT DOCUMENTS

| | | |
|---|---|---|
| 3,798,360 A | 3/1974 | Feistel |
| 4,004,089 A | 1/1977 | Richard et al. |
| 4,316,055 A | 2/1982 | Feistel |
| 4,605,820 A | 8/1986 | Campbell, Jr. |
| 4,607,137 A | 8/1986 | Jansen et al. |
| 4,613,901 A | 9/1986 | Gilhousen et al. |

(Continued)

FOREIGN PATENT DOCUMENTS

| | | |
|---|---|---|
| EP | 0 599 366 | 2/1993 |
| WO | WO 96-06504 | 2/1996 |
| WO | WO 99/18729 | 4/1999 |
| WO | WO 99/19822 | 4/1999 |
| WO | WO 01-17251 | 3/2001 |
| WO | WO 01/17251 A1 | 3/2001 |

OTHER PUBLICATIONS

Bruce Schneier, Applied Cryptography, 10/96, second edition, Wiley and sons, Inc, pp. 265–278.*

(Continued)

*Primary Examiner*—Hosuk Song
(74) *Attorney, Agent, or Firm*—Blakely, Sokoloff, Taylor & Zafman LLP

(57) ABSTRACT

A video source application in a video source device requests from a video hardware interface of the video source device status with respect to a link linking the video source device to an external video sink device, and supplements the status request with a first basis value to a symmetric ciphering/deciphering process. The video source application, upon receiving from the video hardware interface the requested status and a verification key, generated using said symmetric ciphering/deciphering process and employing the first basis value, verifies the correctness of the verification key to determine whether to trust said provided status. In like manner, the video source application requests from the video hardware interface a secret the video hardware interface uses to cipher video to be transmitted by the video hardware interface to the external video sink device. The secret request is supplemented with a second basis value to the symmetric ciphering/deciphering process. The secret is returned in a cipher form, ciphered using a ciphering key generated using the second basis value. The video source application deciphers the secret using its own independently generated copy of the ciphering key.

49 Claims, 6 Drawing Sheets

U.S. PATENT DOCUMENTS

| | | | |
|---|---|---|---|
| 4,641,102 | A | 2/1987 | Coulthart et al. |
| 4,897,875 | A | 1/1990 | Pollard et al. |
| 4,953,208 | A | 8/1990 | Ideno |
| 4,991,208 | A | 2/1991 | Walker et al. |
| 5,020,106 | A | 5/1991 | Rabold et al. |
| 5,029,207 | A * | 7/1991 | Gammie ............... 380/228 |
| 5,117,379 | A | 5/1992 | Yanagiuchi et al. |
| 5,195,136 | A | 3/1993 | Hardy et al. |
| 5,295,188 | A | 3/1994 | Wilson et al. |
| 5,341,425 | A | 8/1994 | Wasilewski et al. |
| 5,341,426 | A | 8/1994 | Barney et al. |
| 5,353,353 | A | 10/1994 | Vijeh et al. |
| 5,490,258 | A | 2/1996 | Fenner |
| 5,509,073 | A | 4/1996 | Monnin |
| 5,533,127 | A | 7/1996 | Luther |
| 5,590,194 | A | 12/1996 | Ryan |
| 5,621,799 | A | 4/1997 | Katta et al. |
| 5,657,095 | A | 8/1997 | Yoshida et al. |
| 5,673,319 | A | 9/1997 | Bellare et al. |
| 5,680,131 | A | 10/1997 | Utz |
| 5,708,714 | A | 1/1998 | Lopez et al. |
| 5,825,879 | A | 10/1998 | Davis |
| 5,842,224 | A | 11/1998 | Fenner |
| 5,852,472 | A | 12/1998 | Prasad et al. |
| 5,860,136 | A | 1/1999 | Fenner |
| 5,862,150 | A | 1/1999 | Lavelle et al. |
| 5,940,509 | A | 8/1999 | Jovanovich et al. |
| 6,005,940 | A | 12/1999 | Kulinets |
| 6,047,103 | A | 4/2000 | Yamauchi et al. |
| 6,061,449 | A | 5/2000 | Candelore et al. |
| 6,118,873 | A | 9/2000 | Lotspiech et al. |
| 6,167,136 | A | 12/2000 | Chou |
| 6,289,102 | B1 | 9/2001 | Ueda et al. |
| 6,345,101 | B1 | 2/2002 | Shukla |
| 6,452,959 | B1 | 9/2002 | McDonough |
| 6,453,304 | B1 | 9/2002 | Manabu et al. |
| 6,466,669 | B1 | 10/2002 | Matsui et al. |
| 6,477,252 | B1 | 11/2002 | Faber et al. |
| 6,654,883 | B1 * | 11/2003 | Tatebayashi ............... 713/168 |

OTHER PUBLICATIONS

Schneier, Bruce, Applied Cryptography, Protocols, Algorithms, and Source Code in C, Second Edition, ©1996, John Wiley & Sons, Inc., Chapter 1, pp. 1–18.

Schneier, Bruce, et al., Unbalanced Feistel Networks and Block–Cipher Design, Feb. 1996, Third International Workshop Proceedings, pp. 1–24.

Stallings, William, Cryptography and Network Security, Jun. 4, 1998, Prentice–Hall, Inc. $2^{nd}$ Edition, Chapter 3.

Infocus Corporation, Digital Visual Interface (DVI) white paper, Nov. 2001, pp. 1–15.

Silicon Image, High–Bandwidth Digital Content Protection white paper, Feb. 2000, pp. 1–11.

Schneier, Bruce; "Applied Cryptography, Second Edition, Protocols, Algorithms, and Source Code in C", John Wiley & Sons, Inc.; Copyright 1996; Chapters 2–6 and 12–17.

Search Report for PCT/US 00/22785, mailed Dec. 6, 2000, 2 pages.

Search Report for PCT/US 00/22834, mailed Dec. 4, 2000, 1 page.

Written Opinion for PCT/US00/22834; 1 page.

The Art Of Computer Programming, vol. 2/Seminumerical Algorithms, ©1969, Addison–Wesley Publishing Company, Inc., Reading, Massachusetts; Menlo Park, California; London; Amsterdam; Don Mills, Ontario; Sydney, pp. 30–31.

High–bandwidth Digital Content Protection System, Revision 1.0, Feb. 17, 2000,. pp. 1–59.

Heys, Howard M., An Analysis of the Statistical Self–Synchronization of Stream Ciphers, IEEE Infocom 2001, pp. 897–904.

Heys, Howard M., Delay Characteristics of Statistical Cipher Feedback Mode, IEEE 2001, pp. 5–9.

Simmons, Gustavus J., Symmetric and Asymmetric Encryption, Computing Surveys, vol. 11, No. 4, Dec. 1979, pp. 305–330.

International Preliminary Examination Report PCT/US00/22834. 6 pages. Mailed Nov. 19, 2001.

Internation Preliminary Examination Report PCT/US00/22785. 7 Pages. Mailed Nov. 5, 2001.

Written Opinion for PCT/US/00/22785; 1 page.

* cited by examiner

| Video Source Application | | Video Hardware Interface |
|---|---|---|
| Generate $C_n$ | $C_n, Ck_{sv}, C_{mode}$ → | Generate $K_u'(Ck_{sv}, Dk_{sv})$<br>Generate $K_p'(K_u', C_n, Bk_{sv})$ |
| Generate $K_u (Ck_{sv}, Dk_{sv})$<br>Generate $K_p (K_u, C_n, Bk_{sv})$ | ← $S', Bk_{sv}, Dk_{sv}$ | Generate $S' = $ status $\| K_p'$ |
| Determine if $K_p = K_p'$ | | |

FIG. 2A

| Video Source Application | | Video Hardware Interface |
|---|---|---|
| Generate $C_n$ | $C_n, Ck_{sv}, C_{mode}$ → | Generate $K_u'(Ck_{sv}, Dk_{sv})$<br>Generate $K_e'(K_u', C_n)$ |
| Generate $K_u(Ck_{sv}, Dk_{sv})$<br>Generate $K_e(K_u, C_n)$ | ← $M', Dk_{sv}$ | $M' = K_e'$ XOR $M_0'$ |
| $M_0' = K_e$ XOR $M'$ | | |

FIG. 2B

| Video Source Application | Video Hardware Interface |
|---|---|
| | $K_u' = \Sigma \text{Dkeys over Ck}_{sv}$<br>$K_1' = \text{OneWay-A}(K_u', \text{LSB40}(C_n))$<br>$K_2' = \text{OneWay-A}(K_1', \text{Bk}_{sv})$<br>$K_p' = \text{OneWay-A}(K_2', \text{status}\|\text{MSB24}(C_n))$ |
| $K_u = \Sigma \text{Ckeys over Dk}_{sv}$<br>$K_1 = \text{OneWay-A}(K_u, \text{LSB40}(C_n))$<br>$K_2 = \text{OneWay-A}(K_1, \text{Bk}_{sv})$<br>$K_p = \text{OneWay-A}(K_2, \text{status}\|\text{MSB24}(C_n))$ | |

FIG. 3A

| Video Source Application | Video Hardware Interface |
|---|---|
| | $K_u' = \Sigma \text{Dkeys over Ck}_{sv}$<br>$K_4' = \text{OneWay-B}(K_u', \text{LSB40}(C_n))$<br>$K_e' = \text{OneWay-B}(K_4', \text{MSB24}(C_n))$ |
| $K_u = \Sigma \text{Ckeys over Dk}_{sv}$<br>$K_4 = \text{OneWay-B}(K_u, \text{LSB40}(C_n))$<br>$K_e = \text{OneWay-B}(K_4, \text{MSB24}(C_n))$ | |

FIG. 3B

METHOD AND APPARATUS FOR PROTECTED EXCHANGE OF STATUS AND SECRET VALUES BETWEEN A VIDEO SOURCE APPLICATION AND A VIDEO HARDWARE INTERFACE

RELATED APPLICATION

This application is a continuation-in-part application to U.S. patent application Ser. No. 09/385,590 and a continuation-in-part to U.S. application Ser. No. 09/385,592, both entitled Digital Video Content Transmission Ciphering and Deciphering Methods and Apparatus, filed on Aug. 29, 1999.

BACKGROUND OF THE INVENTION

1. Field of the Invention

The present invention relates to the field of content protection. More specifically, the present invention addresses the protection accorded to exchange of status and secret values between a video source application and a video hardware interface of a video source device.

2. Background Information

In general, entertainment, education, art, and so forth (hereinafter collectively referred to as "content") packaged in digital form offer higher audio and video quality than their analog counterparts. However, content producers, especially those in the entertainment industry, are still reluctant in totally embracing the digital form. The primary reason being digital contents are particularly vulnerable to pirating. As unlike the analog form, where some amount of quality degradation generally occurs with each copying, a pirated copy of digital content is virtually as good as the "gold master". As a result, much effort have been spent by the industry in developing and adopting techniques to provide protection to the distribution and rendering of digital content.

Historically, the communication interface between a video source device (such as a personal computer) and a video sink device (such as a monitor) is an analog interface. Thus, very little focus has been given to providing protection for the transmission between the source and sink devices. With advances in integrated circuit and other related technologies, a new type of digital interface between video source and sink devices is emerging. The availability of this type of new digital interface presents yet another new challenge to protecting digital video content. While in general, there is a large body of cipher technology known, the operating characteristics such as the volume of the data, its streaming nature, the bit rate and so forth, as well as the location of intelligence, typically in the source device and not the sink device, present a unique set of challenges, requiring a new and novel solution. Parent applications Ser. Nos. 09/385,590 and 09/385,592 disclosed various protocol and cipher/deciphering techniques to protect the transmission.

Similar protection challenges exist for exchanges of status and secret values between the video generating video source application and the video transmitting video hardware interface of the video source device. Thus, method and apparatus to protect these exchanges are desired.

SUMMARY OF THE INVENTION

A video source application in a video source device requests from a video hardware interface of the video source device status with respect to a link linking the video source device to an external video sink device, and supplements the status request with a basis value to a symmetric ciphering/deciphering process. The video source application, upon receiving from the video hardware interface the requested status and a verification key, generated using a symmetric ciphering/deciphering process and employing the basis value, verifies the correctness of the verification key to determine whether to trust said provided status.

BRIEF DESCRIPTION OF DRAWINGS

The present invention will be described by way of exemplary embodiments, but not limitations, illustrated in the accompanying drawings in which like references denote similar elements, and in which:

FIGS. 2a–2b illustrate a symmetric ciphering/deciphering process based method for the video hardware interface to provide sensitive information such as status and secret values to the; video source application, in accordance with two embodiments;

FIGS. 3a–3b illustrate the symmetric ciphering/deciphering process of FIGS. 2a–2b employed to facilitate provision of status and secret values from the video hardware interface to the video source application, in accordance with one embodiment each.

DETAILED DESCRIPTION OF THE INVENTION

In the following description, various aspects of the present invention will be described, and various details will be set forth in order to provide a thorough understanding of the present invention. However, it will be apparent to those skilled in the art that the present invention may be practiced with only some or all aspects of the present invention, and the present invention may be practiced without the specific details. In other instances, well known features are omitted or simplified in order not to obscure the present invention.

Various operations will be described as multiple discrete steps performed in turn in a manner that is most helpful in understanding the present invention. However, the order of description should not be construed as to imply that these operations are necessarily performed in the order they are presented, or even order dependent. Lastly, repeated usage of the phrase "in one embodiment" does not necessarily refer to the same embodiment, although it may.

Figure 1:
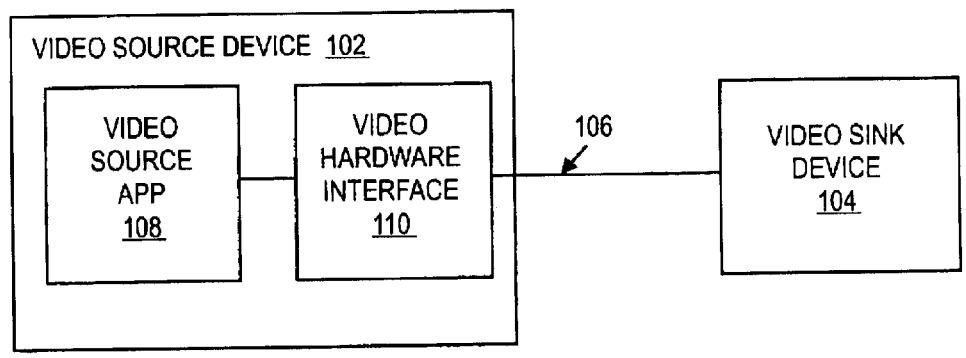
FIG. 1 illustrates an overview of the present invention in accordance with one embodiment.

Referring now to FIG. 1, wherein a block diagram illustrating an overview of the present invention, in accordance with one embodiment is shown. As illustrated, video source device 102 and video sink device 104 are coupled to each other via digital video link 106. Video source device 102 includes video source application 108 and video hardware interface 110. Video source application 108 generates and provides video content to video hardware interface 110, which in turn ciphers video content and provides the video content in a ciphered form to video sink device 104 through digital video link 106 as disclosed in the aforementioned parent applications, thereby protecting video contents. Additionally, video source application 108 and video hardware interface 110 exchange various status and control information, including in particular status information about the link between video hardware interface 110 and video sink device 104, and secret values employed by video hardware interface 110 to cipher video content as disclosed in the parent applications. In accordance with the present invention, video source application 108 and video hardware interface 110 are equipped to be able to jointly practice a symmetric ciphering/deciphering process. As a result, at least status and secret values may be provided from video hardware interface 110 to video source application 108 in a protected manner, maintaining protection to the video content being distributed to video sink device 104.

Except for the teachings of the present invention incorporated, to be described more fully below, video source application 108 is intended to represent a broad range of video source applications known in the art, while video hardware interface 110 is substantially constituted as disclosed in the parent applications. As will be readily apparent from those skilled in the art, the present invention advantageously allows the same hardware resources of video hardware interface 110 to be used to protect the exchanges with video source application 108 as well as protecting the video content transmitted to video sink device 104.

As disclosed in the parent applications, examples of video source device 102 includes but not limited to computers of all sizes (from palm size device to desktop device, and beyond), set-up boxes, or DVD players, whereas examples of video sink devices include but not limited to CRT monitors, flat panel displays or television sets. As to digital video link 106, it may be implemented in any one of a number of mechanical and electrical forms, as long as they are consistent with the operating requirement (i.e. speed, bit rate and so forth), and a mechanism (which may be in hardware or through protocol) is provided to allow control information to be exchanged between video source and sink devices 102 and 104.

Before proceeding to further described the present invention, while for ease of understanding, video source application 108 is shown to be interacting with video hardware interface 110 "directly", those skilled in the art will appreciate that typically video hardware interface 110 has an associated driver to insulate the hardware specifics from the interacting software, such as video source application 108 in this case. Accordingly, in most embodiments, video source application 108 interacts with video hardware interface 110 through its associated driver.

FIGS. 2a–2b illustrate two overviews of the symmetric ciphering/deciphering process based method for facilitating exchanges of status and control information between video source application 108 and video hardware interface 110, in accordance with two embodiments. FIG. 2a is an embodiment particularly suitable for exchanges involving status and control information of short bit lengths, such as on/off status, whereas FIG. 2b is an embodiment particular suitable for exchanges involving status and control information of longer bit lengths, such as the secret values employed by video hardware interface 110 to cipher video contents. What constitutes short or longer bit length is application dependent. As between video hardware interface 110 and video sink device 104, video source application 108 and video hardware interface 110 are assumed to have each been provided with an array of private "cryptographic" keys and a complementary identifier by a certification authority. In one embodiment, each of video source application 108 and video hardware interface 104 is pre-provided with an array of 40 56-bit private "cryptographic" keys by the certification authority. Cn is a 64-bit random number, and the keys are 56-bit long. For more information on the above described authentication process, see co-pending U.S. patent application Ser. No. 09/275,722, filed on Mar. 24, 1999, entitled Method and Apparatus for the Generation of Cryptographic Keys, having common assignee with the present application.

As illustrated in FIG. 2a, whenever a need occurs for video source application to retrieve a status of the short bit length type, video source application 108 first generates and provides a basis value to the symmetric ciphering/deciphering process to sink hardware interface 110. For the illustrated embodiment, the basis value is a random number (Cn). Cn may be generated in any one of a number of techniques known in the art. Additionally, video source application 108 also provides a key selection value ($Ck_{SV}$) to video hardware interface 110. Further, for the illustrated embodiment, which is an embodiment where the same hardware resources of video hardware interface 110 are used to satisfy video source application's request for status and control information of the short or long bit length type, video source application 108 also provides a mode indicator ($C_{mode}$) to video hardware interface 110 to denote the type of status and control information being requested. These parameters, $C_n$, $Ck_{SV}$, and $C_{mode}$ may be provided via one or more "packets", as well as in conjunction with other information.

In response, video hardware interface 110 generates an authentication key $K_u'$ based on its provided array of private "cryptographic" keys Dkeys and the selection key $Ck_{SV}$ provided by video source application 108. Video hardware interface 110 then generates the verification key $K_p'$ based on the provided basis value $C_n$, the generated authentication key $K_u'$, the status to be returned, and the selection key $Bk_{SV}$ it was provided by video sink device 104 for use to protectively provide video contents in a ciphered form to video sink device 104 based on a symmetric cipher/deciphering process (see parent application for further detail).

Upon generating $K_p'$, for the illustrated embodiment, video hardware interface 110 returns the requested status along with $K_p'$. In one embodiment, the two values are concatenated together (S'), and returned at the same time. In alternate embodiments, it may be returned separately. Additionally, for the illustrated embodiment, video hardware interface 110 also returns $Bk_{SV}$ and $Dk_{SV}$ to video source application 108.

Over on the video source application side, upon receipt of S', $Bk_{SV}$ and $Dk_{SV}$, video source application 108 independently generates its own copy of $K_u$ based on its array of pre-provided private "cryptographic" keys Ckeys, and $Dk_{SV}$. Next, video source application 108 independently generates its own copy of $K_p$ based on $C_n$, the returned status, and $Bk_{SV}$. Then, video source application 108 compares its independently generated $K_p$ with the received $K_p'$ to determine if it should trust the status provided (when $K_p=K_p'$) or distrust the status provided (when $K_p=/=K_p'$).

Referring now to FIG. 2b, in like manner, whenever a need occurs for video source application to retrieve a control information of the longer bit length type, such as the aforementioned secret value, video source application 108 also first generates and provides a basis value to the symmetric ciphering/deciphering process to sink hardware interface 110. Again, in one embodiment, the basis value is a random number (Cn), and it may be generated in any one of a number of techniques known in the art. Additionally, video source application 108 also provides a key selection value ($Ck_{SV}$) to video hardware interface 110. Further, similar to the embodiment of FIG. 2a, where the same hardware resources of video hardware interface 110 are used to satisfy video source application's request for status and control information of the short or long bit length type, video source application 108 also provides a mode indicator ($C_{mode}$) to video hardware interface 110 to denote the type of status and control information being requested. As before, these parameters, $C_n$, $Ck_{SV}$, and $C_{mode}$ may be provided via one or more "packets", as well as in conjunction with other information.

In response, video hardware interface 110 generates an authentication key $K_u'$ based on its provided array of private "cryptographic" keys Dkeys and the selection key $Ck_{SV}$ provided by video source application 108. Video hardware interface 110 then generates a cryptographic key $K_e'$ using $K_u'$ and the provided basis value $C_n$.

Upon generating $K_e'$, video hardware interface 110 ciphers the requested control information, e.g. secret value $M_0'$, using $K_e'$. Video hardware interface 110 then returns $M_0'$ in a ciphered form (M') to video source application 108. Additionally, for the illustrated embodiment, video hardware interface 110 also returns $Dk_{SV}$ to video source application 108.

Over on the video source application side, upon receipt of M' and $Dk_{SV}$, video source application 108 independently generates its own copy of $K_u$ based on Ckeys and $Dk_{SV}$. Next, video source application 108 independently generates its own copy of $K_e$ based on $C_n$ and $K_u$. Then, video source application 108 deciphers M', recovering $M_0'$ using $K_e$.

FIGS. 3a–3b illustrate the symmetric ciphering/deciphering processes of FIGS. 2a14 2b in further detail, in accordance with one embodiment each. As illustrated in FIG. 3a, for the exchange of status and control information of short bit length, video hardware interface 110 first generates the authentication key $K_u'$ by summing its pre-provided private "cryptographic" keys Dkeys over the provided selection key $Ck_{SV}$ from video source application 108. Upon generation of the authentication key $K_u'$, video hardware interface 110 generates a first intermediate key $K_1'$, ciphering the least significant 40 bits (LSB40) of the provided basis value $C_n$ by applying a one way function to it, using $K_u'$. For the illustrated embodiment, the same one way function is used for the exchange of status and control information of both short and longer bit length type. The one way function is applied in a first mode, also referred to as the A-mode, in accordance with the value of $C_{mode}$. Next, video hardware interface 110 generates a second intermediate key $K_2'$ by applying the same one way function (under the same mode) to the selection key $BK_{SV}$ provided by video sink device 104, using $K_1'$. Finally, video hardware interface 110 generates the verification key $K_p'$ by applying the same one way function (under the same mode) to the status concatenated with most significant 24 bits (MSB24) of the provided basis value $C_n$, using $K_2'$.

Over on the video source application side, upon receipt of S', $Dk_{SV}$, and $BK_{SV}$, video source application 108 first independently generates its own copy of the authentication key $K_u$ by summing its selection keys Ckeys over $Dk_{SV}$. Upon generation of the authentication key $K_u$, video source application 108 independently generates its own copy of the first intermediate key $K_1$ by applying a similar one way function to the least significant 40 bits (LSB40) of the basis value $C_n$ provided to video hardware interface 110, using $K_u$. Video source application 108 also uses the same one way function to facilitate the exchange of status and control information of both short and longer bit length type. Thus, the common one way function is applied in the earlier described first mode, also referred to as the A-mode, in accordance with the value of $C_{mode}$. Next, video source application 108 independently generates its own copy of the second intermediate key $K_2$ by applying the same one way function (under the same mode) to the selection key $BK_{SV}$, using $K_1$. Finally, video source application 108 independently generates its own copy of $K_p$ by applying the same one way function (under the same mode) to the status concatenated with the most significant 24 bits (MSB24) of the basis value $C_n$, using $K_2$.

FIG. 3b illustrates the embodiment for handling the exchange of status and control information of longer bit length, video hardware interface 110 first generates the authentication key $K_u'$ by summing its selected one of the pre-provided private "cryptographic" keys over the provided selection key from video source application 108. Upon generation of the authentication key $K_u'$, video hardware interface 110 generates another intermediate key $K_4'$ by applying a one way function to the least significant 40 bits (LSB40) of the provided basis value $C_n$, using $K_u'$. For the illustrated embodiment, the same one way function is used for the exchange of status and control information of both short and longer bit length type. The one way function is applied in a second mode, also referred to as the B-mode, in accordance with the value of $C_{mode}$. Next, video hardware interface 110 generates $K_e'$, the ciphering key, by applying the same one way function (under the same mode) to the most significant 24 bits (MSB24) of the provided basis value $C_n$, using $K_4'$.

Over on the video source application side, upon receipt of M' and $Dk_{SV}$, video source application 108 first independently generates its own copy of the authentication key $K_u$ by summing its array of private "cryptographic" keys Ckeys over $Dk_{SV}$. Upon generation of the authentication key $K_u$, video source application 108 independently generates its own copy of intermediate key $K_4$ by applying a similar one way function to the least significant 40 bits (LSB40) of the basis value $C_n$, using $K_u$. Video source application 108 also uses the same one way function to facilitate the exchange of status and control information of both short and longer bit length type. Thus, the common one way function is applied in the earlier described second mode, also referred to as the B-mode, in accordance with the value of $C_{mode}$. Next, video source application 108 independently generates its own copy of $K_p$, the deciphering key, by applying the same one way function (under the same mode) to the most significant 24 bits (MSB24) of the basis value $C_n$, using $K_1$.

In one embodiment, $K_1$ and $K_4$ are generated only by video source application 108, once per "session", using highly protected Ckeys, and stored in the application for later use for the remainder of the session. In other words, compromise of K1 or K4 allows "attack" for only one session (compromise of Ckeys would allow "attack" for unlimited number of sessions). This approach has the following advantages. Since $Dk_{SV}$ is a constant, video source application 108 can fix the least significant 40 bits of $C_n$, and change only the most significant 24 bits of $C_n$ for different status and information requests, thereby allowing video source application 108 to rerun the protocol for different requests at the computation of $K_1$ and $K_4$ and speed up the transfer of these information.

Figure 4A:
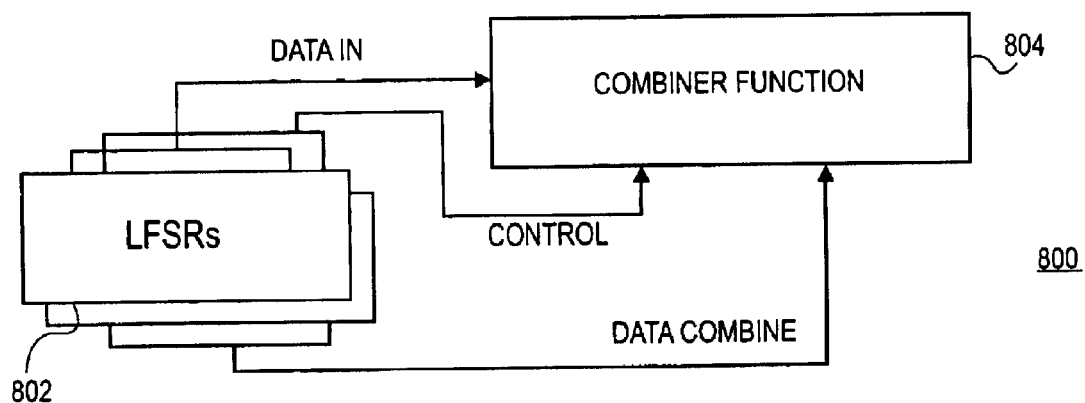
FIGS. 4a–4c illustrate a one way function suitable for use to practice the symmetric ciphering/deciphering process of FIGS. 3a–3b in further detail, in accordance with one embodiment.
Figure 4B:
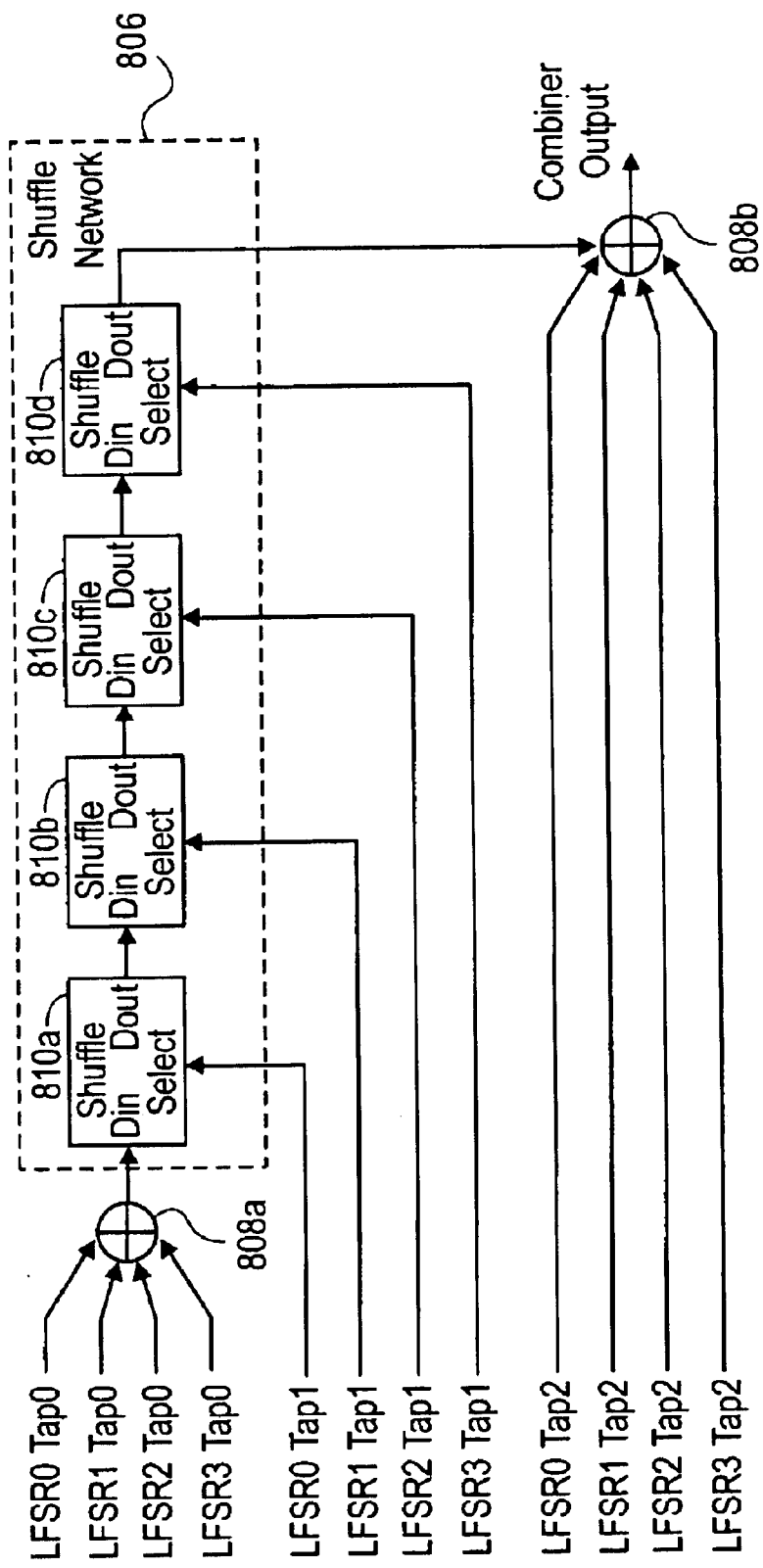
Figure 4C:
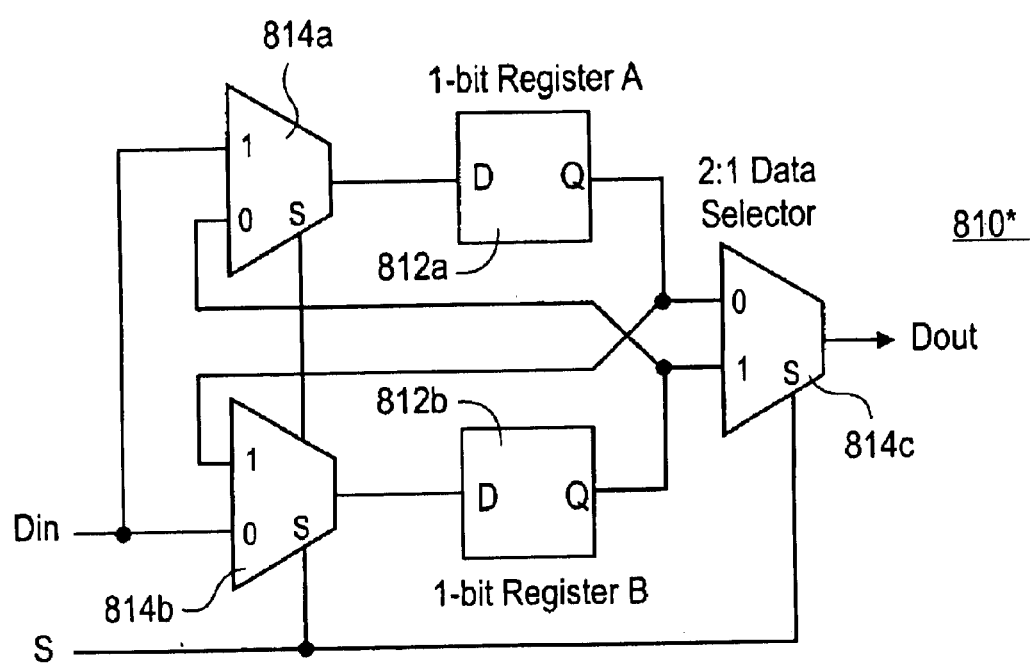

FIGS. 4a–4c illustrate a one-way function suitable for use to practice the symmetric ciphering/deciphering process of FIG. 3a-3b, in accordance with one embodiment. As illustrated in FIG. 4a, the one way function 800 includes a number of linear feedback shift registers (LFSRs) 802 and combiner function 804, coupled to each other as shown. LFSRs 802 and combiner function 804 are collectively initialized with the appropriate keys and data values, depending the mode of operation $C_{mode}$. During operation, the values are successively shifted through LFSRs 802. Selective outputs are taken from LFSRs 802, and combiner function 804 is used to combine the selective outputs to generate the desired outputs.

In one embodiment, four LFSRs of different lengths are employed. Three sets of outputs are taken from the four LFSRs. The polynomials represented by the LFSR and the bit positions of the three sets of LFSR outputs are given by the table to follow:

| LFSR | Polynomial | Combining Function Taps | | |
|---|---|---|---|---|
| | | 0 | 1 | 2 |
| 3 | $x^{27} + x^{24} + x^{21} + x^{17} + x^{13} + x^8 + 1$ | 8 | 17 | 26 |
| 2 | $x^{26} + x^{23} + x^{18} + x^{15} + x^{12} + x^8 + 1$ | 8 | 16 | 25 |
| 1 | $x^{24} + x^{21} + x^{18} + x^{14} + x^{10} + x^7 + 1$ | 7 | 15 | 23 |
| 0 | $x^{23} + x^{20} + x^{18} + x^{12} + x^9 + x^8 + 1$ | 7 | 14 | 22 |

The initalization of the LFSRs and the combiner function, more specifically. the shuffling network of the combiner function, is in accordance with the following table.

| | Bit Field | One Way-A Initial Value | One Way-B Initial Value |
|---|---|---|---|
| LFSR3 | [26:22] | Data[39:35] | Data[34:30] |
| | [21] | inverse of LFSR3 initialization bit [9] | inverse of LFSR3 initialization bit [9] |
| | [20:14] | Data[34:28] | Data[29:23] |
| | [13:0] | Key[55:42] | Key[48:35] |
| LFSR2 | [25:22] | Data[27:24] | Data[22:19] |
| | [21] | inverse of LFSR2 initialization bit [8] | inverse of LFSR2 initialization bit [8] |
| | [20:14] | Data[23:17] | data[18:12] |
| | [13:0] | Key[41:28] | Key[34:21] |
| LFSR1 | [23:19] | Data[16:12] | Data[11:7] |
| | [18] | inverse of LFSR1 initialization bit [5] | inverse of LFSR1 initialization bit [5] |
| | [17:14] | Data[11:8] | Data[6:3] |
| | [13:0] | Key[27:14] | Key[20:7] |
| LFSR0 | [22:20] | Data[7:5] | Data[2:0] |
| | [19] | inverse of LFSR0 initialization bit [10] | inverse of LFSR0 initialization bit [10] |
| | [18:14] | Data[4:0] | Data[39:35] |
| | [13:7] | Key[13:7] | Key[6:0] |
| | [6:0] | Key[6:0] | Key[55:49] |
| Shuffle Network | Register A | 0 | 0 |
| | Register B | 1 | 1 |

Data are $LSB40(C_n)$, $BK_{SV}$ and $MSB24(C_n)$, whereas Keys are $K_u$, $K_1$, $K_2$ and $K_4$.

The combined result is generated from the third set of LFSR outputs, using the first and second set of LFSR outputs as data and control inputs respectively to combiner function 804. The third set of LFSR outputs are combined into a single bit.

FIG. 4*b* illustrates combiner function 804 in further detail, in accordance with one embodiment. As illustrated, combiner function 804 includes shuffle network 806 and XOR 808*a*–808*b*, serially coupled to each other and LFSRs 802 as shown. For the illustrated embodiment, shuffle network 806 includes four binary shuffle units 810*a*–810*d* serially coupled to each other, with first and last binary shuffle units 810*a* and 810*d* coupled to XOR 808*a* and 808*b* respectively. XOR 808*a* takes the first group of LFSR outputs and combined them as a single bit input for shuffle network 806. Binary shuffle units 810*a*–810*d* serially propagate and shuffle the output of XOR 808*a*. The second group of LFSR outputs are used to control the shuffling at corresponding ones of binary shuffle units 810*a*–810*d*. XOR 808*b* combines the third set of LFSR outputs with the output of last binary shuffle unit 810*d*.

FIG. 4*c* illustrates one binary shuffle unit 810* (where * is one of a–d) in further detail, in accordance with one embodiment. Each binary shuffle unit 810* includes two flip-flops 812*a* and 812*b*, and a number of selectors 814*a*–814*c*, coupled to each other as shown. Flip-flops 812*a* and 812*b* are used to store two state values (A, B). Each selector 814*a*, 814*b* or 814*c* receives a corresponding one of the second group of LFSR outputs as its control signal. Selector 814*a*–814*b* also each receives the output of XOR 808*a* or an immediately preceding binary shuffle unit 810* as input. Selector 814*a*–814*b* are coupled to flip-flops 812*a*–812*b* to output one of the two stored state values and to shuffle as well as modify the stored values in accordance with the state of the select signal. More specifically, for the illustrated embodiment, if the stored state values are (A, B), and the input and select values are (D, S), binary shuffle unit 810* outputs A, and stores (B, D) if the value of S is "0". Binary shuffle unit 810* outputs B, and stores (D, A) if the value of S is "1".

In one embodiment, once the data values are loaded into the registers and the shuffle networks, the one-way function is clocked for 32 clocks to mix the data and key bits. During this warm up period, the 32 output bits are discarded. As a result, the initial output stream is a non-linear function of many key and data bits. In alternate embodiments, depending on the desired robustness level, the present invention may be practiced with shorter or longer warm up period.

Those skilled in the art will appreciate that this one way function substantially parallel one embodiment of the one way function disclosed in the parent applications for the cipher employed by video hardware interface 110 to cipher video content to be transmitted to video sink device 104. Accordingly, video hardware interface 110 may employ the same one way function to facilitate exchange of status and control information with video source application 108 in a protected manner, as well as to cipher video content for video sink device 104.

Accordingly, a novel method and apparatus for ciphering and deciphering video content to protect the video content from unauthorized copying during transmission has been described.

Epilogue

From the foregoing description, those skilled in the art will recognize that many other variations of the present invention are possible. Thus, the present invention is not limited by the details described, instead, the present invention can be practiced with modifications and alterations within the spirit and scope of the appended claims.

What is claimed is:

1. In a video source device, a method comprising:
   a video source application requesting from a video hardware interface status with respect to a link linking said video source device to an external video sink device, and supplementing said status request with a first basis value to a symmetric ciphering/deciphering process;
   the video source application receiving from said video hardware interface said requested status and a verification key, generated through said symmetric ciphering/deciphering process employing said first basis value; and the video source application verifying the correctness of said verification key to determine whether to trust said provided status.

2. The method of claim 1, wherein said method further comprises said video source application supplementing said status request with a selection key for the video hardware interface to use to generate an authentication key for use to generate said verification key.

3. The method of claim 1, wherein said verification of the correctness of the received verification key comprises said video source application independently generating its own copy of the verification key.

4. The method of claim 3, wherein said independent generation of said video source application's own copy of said verification key comprises said video source application independently generating its own copy of an authentication key by summing a plurality of cryptographic keys over a selection key received from said video hardware interface.

5. The method of claim 3, wherein said independent generation of said video source application's own copy of said verification key comprises said video source application applying a one way function to at least a first selected subset of said first basis value provided to said video hardware interface using an independently generated copy of an authentication key.

6. The method of claim 5, wherein said independent generation of said video source application's own copy of said verification key further comprises said video source application applying said one way function to a selection key said video hardware interface received from said video sink device for use by said video hardware interface to authenticate said video sink device, using the result of said first application of the one-way function.

7. The method of claim 6, wherein said independent generation of said video source application's own copy of said verification key further comprises said video source application applying said one way function to at least a second selected subset of said first basis value provided to said video hardware interface using the result of said second application of the one-way function.

8. The method of claim 6, wherein said independent generation of said video source application's own copy of said verification key further comprises said video source application applying said one way function to at least said status using the result of said second application of the one-way function.

9. The method of claim 1, wherein said method further comprises said video source application requesting from said video hardware interface a secret employed by said video hardware interface to cipher video to be transmitted by said video hardware interface to said external video sink device, and supplementing said secret request with a second basis value to said symmetric ciphering/deciphering process;

the video source application receiving from said video hardware interface said requested secret in a ciphered form, having been ciphered with a ciphering key generated using said symmetric ciphering/deciphering process and employing said second basis value; and the video source application deciphering said ciphered secret using an independently generated copy of said ciphering key.

10. The method of claim 9, wherein said method further comprises said video source application supplementing said secret request with a selection key for the video hardware interface to use to generate an authentication key for use by said symmetric ciphering/deciphering process.

11. The method of claim 9, wherein said method further comprises said video source application independently generating its own copy of the ciphering key.

12. The method of claim 11, wherein said independent generation of said video source application's own copy of said ciphering key comprises said video source application independently generating an authentication key by summing a plurality of cryptographic keys over a selection key received from said video hardware interface.

13. The method of claim 11, wherein said independent generation of said video source application's own copy of said ciphering key comprises said video source application applying a one way function to at least a first selected subset of said second basis value provided to said video hardware interface using an independently generated copy of an authentication key.

14. The method of claim 13, wherein said independent generation of said video source application's own copy of said ciphering key further comprises said video source application applying said one way function to at least a second selected subset of said second basis value provided to said video hardware interface using the result of said first application of the one-way function.

15. In a video source device, a method comprising:

a video source application requesting from a video hardware interface a secret employed by said video hardware interface to cipher video to be transmitted by said video hardware interface to an external video sink device, and supplementing said secret request with a basis value to a symmetric ciphering/deciphering process between said video source application and said video hardware interface;

the video source application receiving from said video hardware interface said requested secret in a ciphered form, having been ciphered using a ciphering key generated using said symmetric ciphering/deciphering process and employing said basis value; and the video source application deciphering said ciphered secret using an independently generated copy of said ciphering key.

16. The method of claim 15, wherein said method further comprises said video source application supplementing said secret request with a selection key for the video hardware interface to use to generate an authentication key for use by said symmetric ciphering/deciphering process.

17. The method of claim 15, wherein said method further comprises said video source application independently generating its own copy of the ciphering key.

18. The method of claim 17, wherein said independent generation of said video source application's own copy of said ciphering key comprises said video source application independently generating an authentication key by summing a plurality of cryptographic keys over a selection key received from said video hardware interface.

19. The method of claim 17, wherein said independent generation of said video source application's own copy of said ciphering key comprises said video source application applying a one way function to at least a first selected subset of said basis value provided to said video hardware interface using an independently generated copy of an authentication key.

20. The method of claim 19, wherein said independent generation of said video source application's own copy of said ciphering key further comprises said video source application applying said one way function to at least a second selected subset of said basis value provided to said video hardware interface using the result of said first application of the one-way function.

21. In a video source device, a method comprising:
 a video hardware interface receiving from a video source application a request for status with respect to a link linking said video source device to an external video sink device, and said status request being supplemented with a first basis value to a symmetric ciphering/deciphering process;
 the video hardware interface returning said requested status to said video source application, and accompanying said returned requested status with a verification key, generated using said symmetric ciphering/deciphering process and employing said first basis value, to allow said video source application to determine whether to trust said returned status.

22. The method of claim 21, wherein said method further comprises said video hardware interface further accompanying said returned status with a selection key for the video source application to use to independently generate its own copy of an authentication key for use to independently generate its own copy of said verification key.

23. The method of claim 21, wherein said generation of said verification key comprises said video hardware interface generating an authentication key by summing a plurality of cryptographic keys over a selection key received from said video source application.

24. The method of claim 21, wherein said generation of said verification key comprises said video hardware interface applying a one way function to at least a first selected subset of said first basis value using an authentication key.

25. The method of claim 24, wherein said generation of said verification key further comprises said video hardware interface applying said one way function to a selection key said video hardware interface received from said video sink device for use by said video hardware interface to authenticate said video sink device, using the result of said first application of the one-way function.

26. The method of claim 25, wherein said generation of said verification key further comprises said video hardware interface applying said one way function to at least a second selected subset of said first basis value using the result of said second application of the one-way function.

27. The method of claim 25, wherein said generation of said verification key further comprises said video hardware interface applying said one way function to at least said status using the result of said second application of the one-way function.

28. The method of claim 21, wherein said method further comprises
 said video hardware interface receiving from said video source application request for a secret employed by said video hardware interface to cipher video to be transmitted by said video hardware interface to said external video sink device, said secret request being also supplemented with a second basis value to said symmetric ciphering/deciphering process; and
 said video hardware interface returning said requested secret in a ciphered form to said video source application, the secret having been ciphered by a ciphering key generated using said symmetric ciphering/deciphering process and employing said second basis value.

29. The method of claim 28, wherein said method further comprises said video hardware interface receiving from said video source application a selection key supplementing said secret request for the video hardware interface to use to generate an authentication key for use in said symmetric ciphering/deciphering process.

30. The method of claim 28, wherein said generation of said ciphering key comprises said video hardware interface generating an authentication key by summing a plurality of cryptographic keys over a selection key received from said video source application.

31. The method of claim 28, wherein said generation of said ciphering key comprises said video hardware interface applying a one way function to at least a first selected subset of said second basis value using an authentication key.

32. The method of claim 31, wherein said generation of said ciphering key further comprises said video hardware interface applying said one way function to at least a second selected subset of said second basis value using the result of said first application of the one-way function.

33. In a video source device, a method comprising
 a video hardware interface receiving from a video source application a request for a secret employed by said video hardware interface to cipher video to be transmitted by said video hardware interface to an external video sink device, said secret request being supplemented with a basis value to a symmetric ciphering/deciphering process between said video hardware interface and said video source application; and
 said video hardware interface returning said requested secret in a ciphered form to said video source application, the secret having been ciphered by a ciphering key generated using said symmetric ciphering/deciphering process and employing said basis value.

34. The method of claim 33, wherein said method further comprises said video hardware interface receiving from said video source application a selection key supplementing said secret request for the video hardware interface to use to generate an authentication key for use in said symmetric ciphering/deciphering process.

35. The method of claim 33, wherein said generation of said ciphering key comprises said video hardware interface generating an authentication key by summing a plurality of cryptographic keys over a selection key received from said video source application.

36. The method of claim 33, wherein said generation of said ciphering key comprises said video hardware interface applying a one way function to at least a first selected subset of said basis value using an authentication key.

37. The method of claim 36, wherein said generation of said ciphering key further comprises said video hardware interface applying said one way function to at least a second selected subset of said basis value using the result of said first application of the one-way function.

38. An article of manufacture comprising:
 a storage medium having stored therein a plurality of programming instructions implementing a video source application that requests from a video hardware interface status with respect to a link linking said video source device to an external video sink device, and supplements said status request with a basis value to a symmetric ciphering/deciphering process, when the programming instructions are executed by a processor, the video source application, upon receiving from said video hardware interface said requested status and a verification key generated using said symmetric ciphering/deciphering process and employing said basis value, further verifies the correctness of said verification key to determine whether to trust said provided status.

39. The article of manufacture of claim 38, wherein as part of said verification of the correctness of the received verification key, said video source application independently generates its own copy of an authentication key by summing a plurality of cryptographic keys over a selection key received from said video hardware interface.

40. The article of manufacture of claim 38, wherein as part of said verification of the correctness of the received verification key, said video source application applies a one way function to at least a first selected subset of said basis value provided to said video hardware interface using an independently generated copy of an authentication key.

41. An article of manufacture comprising:

a storage medium having stored therein a plurality of programming instructions implementing a video source application that requests from a video hardware interface a secret employed by said video hardware interface to cipher video to be transmitted by said video hardware interface to an external video sink device, and supplements said secret request with a basis value to a symmetric ciphering/deciphering process between said video source application and said video hardware interface, when the programming instructions are executed by a processor, the video source application, upon receiving from said video hardware interface said requested secret in a ciphered form, having been ciphered using a ciphering key generated using said symmetric ciphering/deciphering process and employing said basis value, further deciphers said ciphered secret using an independently generated copy of said ciphering key.

42. The article of manufacture of claim 41, wherein said video source application independently generates its own copy of said ciphering key, including generation of an authentication key by summing a plurality of cryptographic keys over a selection key received from said video hardware interface.

43. The article of manufacture of claim 41, wherein said video source application independently generates its own copy of said ciphering key, including application of a one way function to at least a first selected subset of said basis value provided to said video hardware interface, using an independently generated copy of an authentication key.

44. An apparatus comprising:

a video hardware interface equipped to securely transmit digital video to an external video sink device coupled to said apparatus by way of said video hardware interface;

a storage medium having stored therein a plurality of programming instructions implementing a video source application that requests from said video hardware interface status with respect to said coupling between said video hardware interface and said external video sink device, and supplements said status request with a basis value to a symmetric ciphering/deciphering process, when the programming instructions are executed, the video source application, upon receiving from said video hardware interface said requested status and a verification key, generated using said symmetric ciphering/deciphering process and employing said basis value, further verifies the correctness of said verification key to determine whether to trust said provided status; and a processor coupled to said storage medium and said video hardware interface to execute said programming instructions.

45. The apparatus of claim 44, wherein said video source application independently generates its own copy of the verification key by summing a plurality of cryptographic keys over a selection key received from said video hardware interface, for use to verify the correctness of the received verification key.

46. The apparatus of claim 44, wherein as part of said verification of the correctness of the received verification key, said video source application applies a one way function to at least a first selected subset of said basis value provided to said video hardware interface using an independently generated copy of an authentication key.

47. An apparatus comprising:

a video hardware interface equipped to securely transmit digital video to an external video sink device coupled to said apparatus by way of said video hardware interface;

a storage medium having stored therein a plurality of programming instructions implementing a video source application that requests from said video hardware interface a secret employed by said video hardware interface to cipher video to be transmitted by said video hardware interface to said external video sink device, and supplements said secret request with a basis value to a symmetric ciphering/deciphering process between said video source application and said video hardware interface, when the programming instructions are executed, the video source application, upon receiving from said video hardware interface said requested secret in a ciphered form, having been ciphered using a ciphering key generated using said symmetric ciphering/deciphering process and employing said basis value, further deciphers said ciphered secret using an independently generated copy of said ciphering key; and a processor coupled to said storage medium and said video hardware interface to execute said programming instructions.

48. The apparatus of claim 47, wherein said video source application independently generates its own copy of said ciphering key, including generation of an authentication key by summing a plurality of cryptographic keys over a selection key received from said video hardware interface.

49. The apparatus of claim 47, wherein said video source application independently generates its own copy of said ciphering key, including application of a one way function to at least a first selected subset of said basis value provided to said video hardware interface using an independently generated copy of an authentication key.

* * * * *